United States Patent
Iwasaki (10) Patent No.: US 7,189,371 B2
(45) Date of Patent: Mar. 13, 2007

(54) FUEL REFORMING SYSTEM

(75) Inventor: Yasukazu Iwasaki, Kanagawa-ken (JP)

(73) Assignee: Nissan Motor Co., Ltd., Yokohama (JP)

( * ) Notice: Subject to any disclaimer, the term of this patent is extended or adjusted under 35 U.S.C. 154(b) by 808 days.

(21) Appl. No.: 10/048,023

(22) PCT Filed: May 8, 2001

(86) PCT No.: PCT/JP01/03832

§ 371 (c)(1),
(2), (4) Date: Jan. 28, 2002

(87) PCT Pub. No.: WO01/92147

PCT Pub. Date: Dec. 6, 2001

(65) Prior Publication Data

US 2002/0131907 A1    Sep. 19, 2002

(30) Foreign Application Priority Data

Jun. 1, 2000    (JP) ............................. 2000-164646

(51) Int. Cl.
*B32B 5/02* (2006.01)
*B32B 27/04* (2006.01)
*B01J 8/00* (2006.01)
*C10L 3/00* (2006.01)

(52) U.S. Cl. ..................... 422/110; 422/108; 422/116; 48/127.7; 48/127.9; 48/197 R; 48/214 A (58) Field of Classification Search ................. 429/19, 429/20, 22, 24; 422/108, 110, 116; 48/127.7, 48/127.9, 197 R, 214 A
See application file for complete search history.

(56) References Cited

U.S. PATENT DOCUMENTS 5,006,425 A        4/1991   Takabayashi ................ 429/23
2001/0046462 A1*  11/2001   Woods et al. ............... 422/211

FOREIGN PATENT DOCUMENTS

| EP | 0 973 219   | 1/2000  |
| EP | 0 973 220   | 1/2000  |
| EP | 0 978 476   | 2/2000  |
| JP | 55-27358 A  | 2/1980  |
| JP | 7-296834 A  | 11/1995 |
| JP | 2000-34101 A | 2/2000 |
| JP | 2000-53403 A | 2/2000 |
| WO | 01/16022    | 3/2001  |

\* cited by examiner

*Primary Examiner*—N. Bhat
(74) *Attorney, Agent, or Firm*—Foley & Lardner LLP (57) ABSTRACT

The invention presents a fuel reforming technique for a mobile fuel cell system capable of obtaining a reformed gas composition usable in fuel cell 200 even if vapor temperature supplied from an evaporator 102 into a fuel reformer 107 varies significantly.

This system comprises means 601, 602 for detecting the flow rate of fuel vapor and oxygen to be supplied into the fuel reformer 107, and means 600 for detecting at least temperature of fuel vapor to be supplied into the fuel reformer, temperature of oxygen, and temperature of mixed gas of fuel vapor and oxygen, in which the ratio of the flow rate of fuel vapor and the flow rate of oxygen is corrected on the basis of the signal value of the temperature detecting means, and oxygen is supplied depending on the corrected ratio.

13 Claims, 10 Drawing Sheets

FUEL REFORMING SYSTEM

BACKGROUND OF THE INVENTION

The present invention relates to a fuel reforming system in a mobile fuel cell system represented by a fuel cell automobile.

Figure 1:
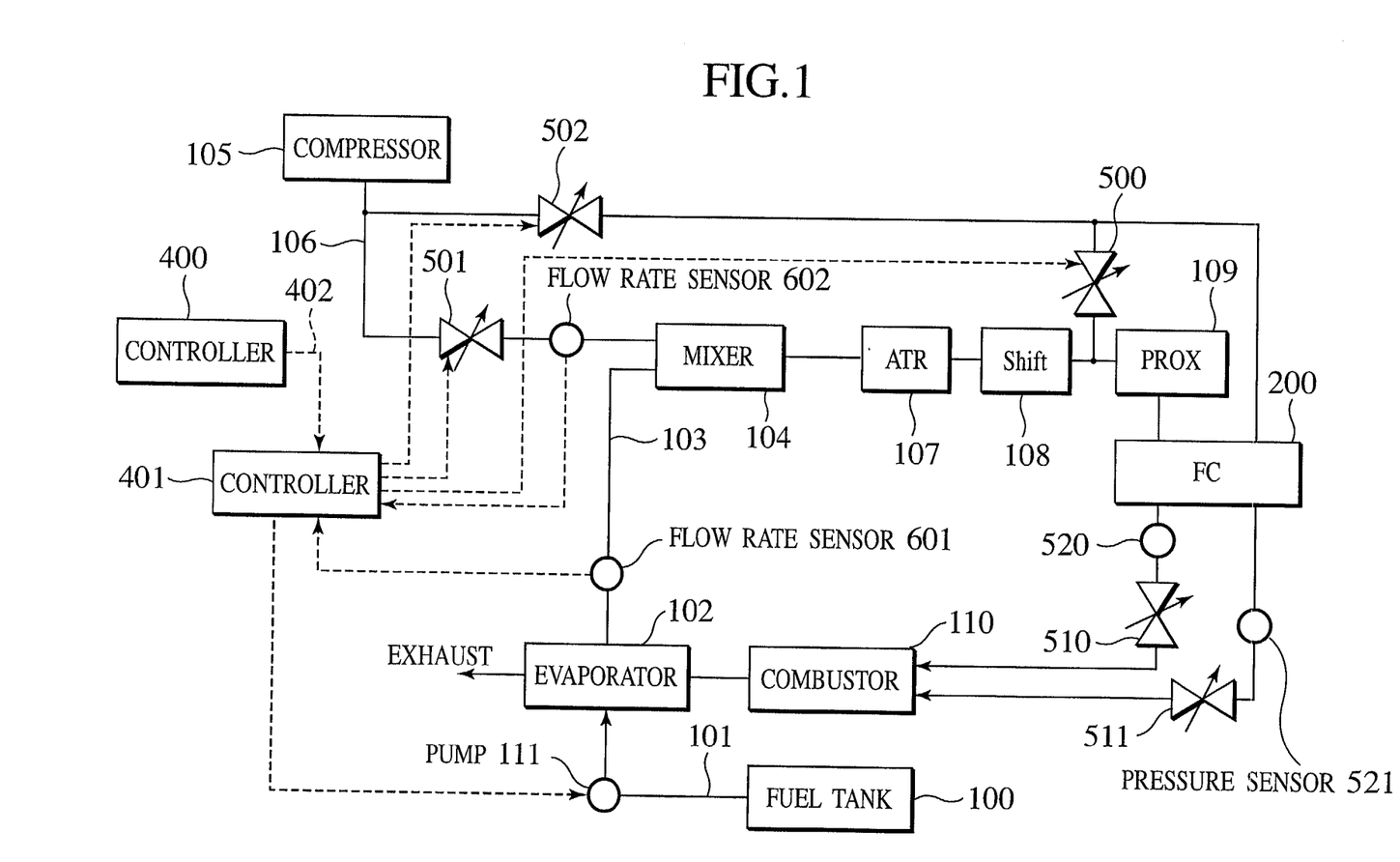
FIG. 1 is a block diagram of a prior art.

A prior art of a fuel reforming system in a mobile fuel cell system represented by a fuel cell automobile is explained by referring to FIG. 1. A mixed solution 101 of water and methanol used as fuel contained in a fuel tank 100 is sent into an evaporator 102, and heated and evaporated to form a mixed vapor 103 of water (steam) and methanol, and sent into a mixer 104. Air 106 is also sent into the mixer 104 from a compressor 105. The mixed steam 103 and air 106 are mixed in the mixer 104, and sent into an autothermal reforming reactor (ATR reactor) 107.

The ATR reactor 107 reforms the methanol used as fuel by catalytic reaction shown in chemical reaction formulas Chem. 1 and Chem. 2 by using water and oxygen in air, and produces an oxygen-rich reformed gas.

$$CH_3OH + H_2O \rightarrow CO_2 + 3H_2 - Q_1 \quad \text{(Chem. 1)}$$

$$CH_3OH + \tfrac{1}{2}O_2 \rightarrow CO_2 + 2H_2 + Q_2 \quad \text{(Chem. 2)}$$

Chemical reaction formula Chem. 1 shows steam reaction of methanol (endothermic reaction), and chemical reaction formula Chem. 2 denotes partial oxidation reaction of methanol (exothermic reaction). The reaction in chemical reaction formula Chem. 1 progresses in steps mainly as shown in chemical reaction formulas Chem. 3 and Chem. 4.

$$CH_3OH \rightarrow CO + 2H_2 - Q_3 \quad \text{(Chem. 3)}$$

$$CO + H_2O \rightarrow CO_2 + H_2 + Q_4 \quad \text{(Chem. 4)}$$

Chemical reaction formula Chem. 3 shows decomposition reaction of methanol (endothermic reaction), and chemical reaction formula Chem. 4 denotes shift reaction of carbon monoxide (exothermic reaction). The ATR reactor 107 is operated in the autothermal condition for balancing the exothermic and endothermic reactions in these formulas. Therefore, once the size or structure of the reactor, or the performance of the catalyst is determined, the flow rate of steam in relation to the flow rate of the fuel methanol, and the flow rate ratio of air flow rate are almost determined.

The rate of the methanol flow rate consumed for partial oxidation reaction (POX) corresponding to the total methanol flow rate being supplied is defined to be POX rate. Since almost all amount of supplied oxygen is consumed in the partial oxidation reaction (POX) in formula 2, the air flow rate necessary for the total methanol flow rate is determined from this POX rate.

At the starting time when a catalyst temperature is low, subsidiary reactions given in the following chemical reaction formulas Chem. 5 and Chem. 6 take place at the same time.

$$CH_3OH \rightarrow HCHO + H_2 \quad \text{(Chem. 5)}$$

$$HCHO \rightarrow CO + H_2 \quad \text{(Chem. 6)}$$

Operating temperature of the ATR reactor 107 is 300 to 600° C., and from the thermodynamic chemical equilibrium, reformed gas containing several percent of carbon monoxide is obtained. Carbon monoxide poisons the fuel electrode catalyst composed of platinum and others of solid polymer type fuel cell (FC) 200, and lowers its activity extremely, and therefore it is necessary to decrease the concentration of carbon monoxide to tens of ppm to 100 ppm by a carbon monoxide remover composed of a shift reactor 108 and selective oxidation reactor (PROX reactor) 109, and then supply into the fuel cell 200.

The reformed gas containing several percent of carbon monoxide is sent into the shift reactor 108, and the carbon monoxide is decreased by the catalyst quick in the shift reaction of chemical reaction formula 4. Operating temperature of the shift reactor 108 is 200 to 300° C., and from the thermodynamic chemical equilibrium, reformed gas containing several percent of carbon monoxide is obtained. The shift reactor 108 may be integrated with the ATR reactor 107. The reformed gas decreased in the carbon monoxide by the shift reaction is sent into the PROX reactor 109, and the carbon monoxide is further decreased to tens of ppm to 100 ppm at most by the catalytic oxidation reaction (exothermic reaction) in the following chemical reaction formula 7. The required oxygen is supplied from the compressor 105 as air.

$$CO + \tfrac{1}{2}O_2 \rightarrow CO_2 + Q_7 \quad \text{(Chem. 7)}$$

In the PROX reactor 109, oxidation reaction is performed in steam atmosphere, and the following hydrogen combustion reaction (exothermic reaction) takes place at the same time. Accordingly, the selectivity of chemical reaction formula Chem. 7 on chemical reaction formula Chem. 8 has a serious effect on the efficiency of fuel reforming system.

$$H_2 + \tfrac{1}{2}O_2 \rightarrow 2H_2O + Q_8 \quad \text{(Chem. 8)}$$

The PROX reactor 109 removes heat generation by chemical reaction formulas Chem. 7 and Chem. 8, and maintains operating temperature at hundred and tens of degrees centigrade, and therefore it is cooled by air, LLC (coolant), or oil, although not shown in the diagram.

Thus, the reformed gas reduced in carbon dioxide to an extremely low concentration and air from the compressor 105 are sent into the fuel electrode and air electrode of the fuel cell (FC) 200, and power is generated.

In the fuel cell 200, it is impossible to use all of the hydrogen contained in the reformed gas, and the reformed gas used in power generation containing a partial residual hydrogen, and the air used in power generation containing a partial residual oxygen are sent into a catalytic combustor 110, and burn. The obtained high temperature exhaust gas is sent into the evaporator 102, and recycled as evaporation energy of methanol and water.

Reference numeral 500 is a flow rate control valve for controlling the flow rate of the air supplied into the PROX reactor 109, 501 is a flow rate control valve for controlling the flow rate of the air supplied into the ATR reactor 107, and 502 is a flow rate control valve for controlling the flow rate of the air supplied into the air electrode of the fuel cell 200.

Reference numeral 510 is a pressure control valve for adjusting the operating pressure of the fuel electrode of the fuel cell 200, and 511 is a pressure control valve for adjusting the operating pressure of the air electrode of the fuel cell 200. Reference numerals 520 and 521 are pressure sensors for detecting the operating pressure at the fuel electrode side and air electrode side of the fuel cell 200, and the pressure is adjusted so that the pressures of these may be equal.

Reference numeral 400 is a controller for mobile energy management, and it sends an operation load signal 402 of the fuel reforming system to a fuel cell controller 401. The fuel cell controller 401, on the basis of the operation load signal 402, drives a pump 111 so as to achieve the flow rate of fuel vapor and air necessary for the ATR reactor 107, and controls the flow rate of the liquid fuel to be supplied into the evaporator 102 and controls the flow rate control valve 501. Reference numerals 601 and 602 are flow rate sensors.

As the evaporator 102, if a huge evaporator capable of controlling temperature of the generated vapor thereof is used, or if an evaporator of an extremely large thermal capacity or heating area is operated at a constant temperature, vapor temperature supplied from the evaporator 102 into the ATR reactor 107 can be kept substantially constant.

Such evaporator may be used in a fuel reforming system for a stationary fuel cell, but the fuel reforming system for mobile fuel cell is limited in space and such evaporator cannot be installed, and the evaporator 102 of compact and simple structure have to be used.

SUMMARY OF THE INVENTION

However, when using such evaporator 102, vapor temperature generated from the evaporator 102 may vary significantly depending on the operating situation of the fuel reforming system in temperature range from a low temperature near the boiling point to a high temperature of exhaust gas temperature supplied from the combustor 110 into the evaporator. As a result, if vapor temperature supplied in the ATR reactor 107 becomes higher than the design specification, the CO concentration in the reformed gas supplied from the ATR reactor 107 into the shift reactor 108 becomes higher than the specification, and the CO concentration supplied from the shift reactor 108 to the PROX reactor 109 becomes high, and hence the CO concentration of the reformed gas supplied from the PROX reactor 109 into the fuel cell 200 may exceed the allowable value for the fuel cell.

To the contrary, if a vapor temperature supplied from the ATR reactor 107 becomes lower than the design specification, the residual methanol concentration in the reformed as supplied from the ATR reactor 107 into the shift reactor 108 becomes higher than the specification, and when removing the CO in the shift reactor 108 and PROX reactor 109, the methanol must be treated in the first place, and the CO is not removed sufficiently, and therefore the CO concentration of the reformed gas supplied from the PROX reactor 109 into the fuel cell 200 exceeds the allowable value for the fuel cell.

Still more, the increase of unreacted methanol components may induce decline of power generation performance depending on the type of the electrode catalyst or hydrogen ion filtration membrane used in the fuel cell 200.

Therefore, in the conventional fuel reforming system for mobile fuel cell system, since a vapor temperature supplied from the evaporator into the ATR reactor changes significantly, the reformed gas composition supplied from the ATR reactor into the CO remover is out of the composition specification that can be treated by the CO remover, and the composition of the reformed gas to be supplied from the fuel reforming system into the fuel cell stack may be out of the original specification composition. Or, when an evaporator capable of controlling temperature of the vapor is used, the evaporator is increased in size and is hence difficult to install, and the cost is raised as well.

The invention is devised in the light of the conventional problems, and it is hence an object thereof to present a fuel reforming technique for a mobile fuel cell system capable of obtaining a reformed gas composition usable in fuel cell even if a vapor temperature supplied from the evaporator into the fuel reformer varies significantly.

The fuel reforming system of the invention is provided with means 601, 602 for detecting a flow rate of fuel vapor and oxygen to be supplied into a fuel reformer 107, and means 600 for detecting temperature of at least one of fuel vapor to be supplied into the fuel reformer, temperature of oxygen, and temperature of mixed gas of fuel vapor and oxygen, in which a ratio of the flow rate of fuel vapor to the flow rate of oxygen is corrected on the basis of the signal value of the temperature detecting means, and the oxygen is supplied depending on the corrected ratio.

In other words, a fuel reforming method of a fuel reforming system of the present invention is characterized in that, the fuel reforming system having a fuel reformer for generating a reformed gas containing the hydrogen by using a gas containing vapors of a gas fuel or a liquid fuel and the oxygen, mixer of vapors of a gas fuel or a liquid fuel and a gas containing the hydrogen, first supplier of vapor of a gas fuel or a liquid fuel into the fuel reformer through the mixer, and second supplier of a gas containing the oxygen into the fuel reformer through the mixer, provided with supplying the liquid fuel into the first supplier; detecting temperature of the vapor of the gas fuel or the liquid fuel supplied into the fuel reformer; determining first correction coefficient of a ratio of first flow rate of the vapors of the gas fuel to second flow rate of the gas containing the oxygen according to the detected temperature; detecting the first flow rate of the vapors; determining the second flow rate to be supplied to the second supplier according to the detected first flow rate and the determined first correction coefficient; adjusting flow rate of the gas containing the oxygen into the fuel reformer by controlling the second supplier according to the determined second flow rate.

DESCRIPTION OF THE PREFERRED EMBODIMENT

Figure 2:
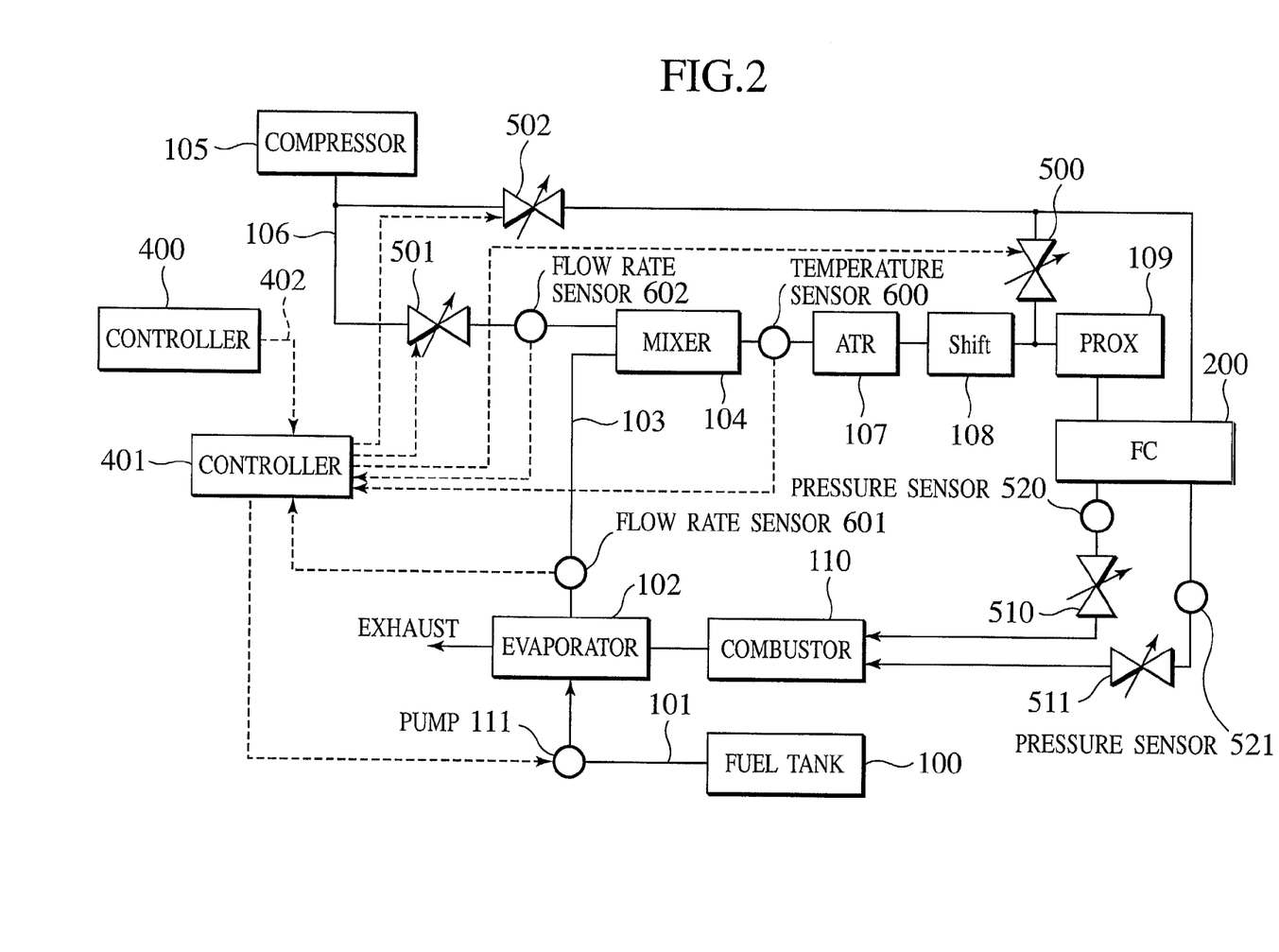
FIG. 2 is a block diagram of a first embodiment of the invention.

A fuel reforming system in a first embodiment of the invention is explained by referring to FIG. 2 to FIG. 7. The fuel reforming system of the first embodiment shown in FIG. 2 is characterized in that a temperature sensor 600 is introduced to detect temperature of mixture to be sent into the an auto thermal reforeming reactor 107 and the output of the temperature sensor 600 is transmitted to a fuel reforming controller 401. In FIG. 2, constituent elements common to those in the prior art in FIG. 1 are identified with same reference numerals.

Figure 3:
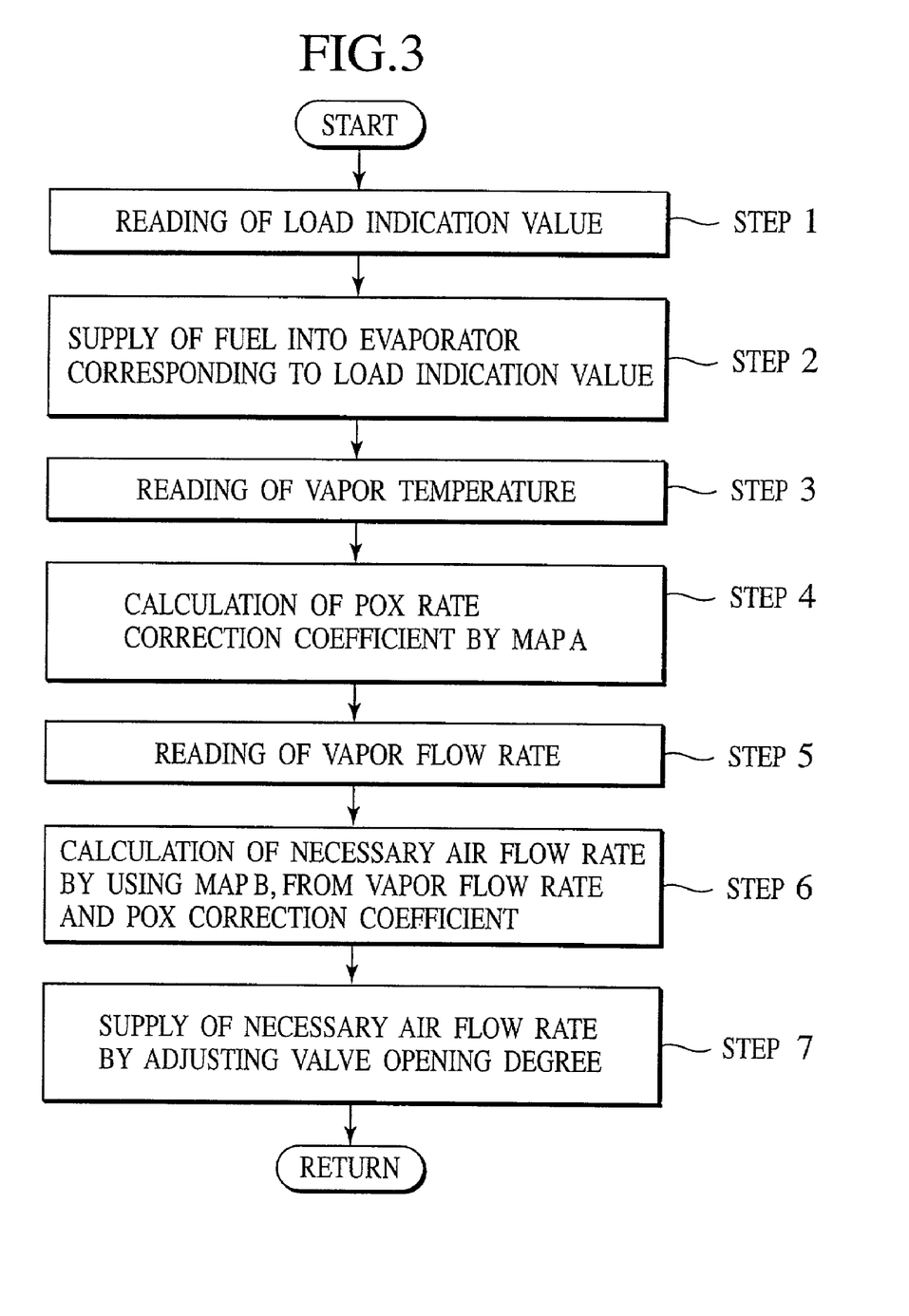
FIG. 3 is a control sequence diagram of the first embodiment.

The control sequence by the fuel reforming controller 401 of this fuel reforming system is explained by referring to FIG. 3.

Step 1: The fuel reforming controller 401 reads in an operation load signal 402 of the fuel reforming system sent from the controller 400.

Step 2: The fuel reforming controller 401 controls the pump 111 on the basis of the operation load signal 402, and supplies a necessary flow rate of liquid fuel into the evaporator 102.

Step 3: The fuel reforming controller 401 reads in a signal value of vapor temperature from the temperature sensor 600.

Step 4: The fuel reforming controller 401 determines the correction coefficient kpox (%) of the POX rate by using map A shown in FIG. 4, from the signal value of vapor temperature of the temperature sensor 600.

Step 5: A signal value of vapor flow rate of fuel is read in from the temperature sensor 601.

Figure 5:
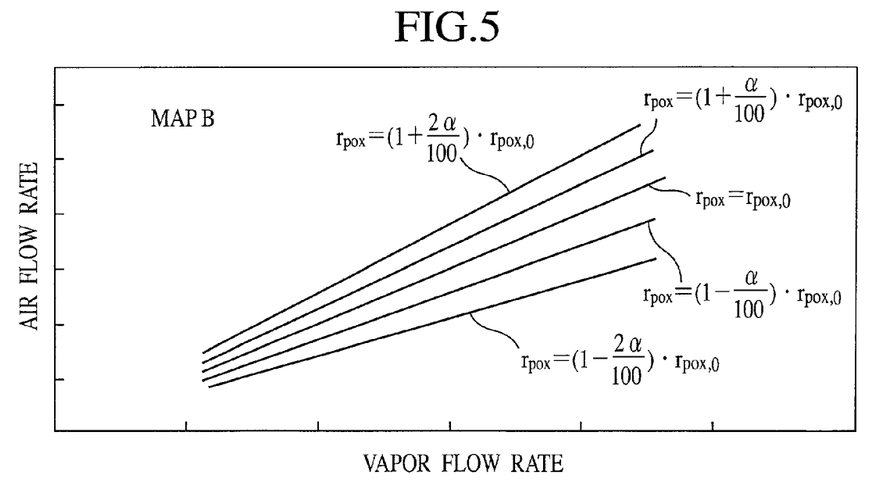
FIG. 5 is a graph of map B (air flow rate in relation to vapor flow rate) used in the first embodiment.

Step 6: From the signal value of the fuel vapor flow rate being read at step 5, and the correction coefficient kpox (%) of the POX rate determined at step 4, the air flow rate to be supplied is determined by using map B shown in FIG. 5. This map B is a graphic expression of the following conversion formula 1.

$$F_{air} = \left(1 + \frac{k_{POX}}{100}\right) \cdot k_1 \cdot \frac{r_{POX,0}}{100} \cdot F_{Fuel,vap} \qquad (1)$$

where $F_{air}$(g/sec):air flow rate        (1)

$F_{Fuel,vap}$(g/sec):fuel vapor flow rate $r_{POX,0}$(%):POX rate of design specification $k_1$:conversion coefficient.

In the formula, $r_{POX,0}$ is approximately 30(%) in near autothermal condition.

Step 7: The valve opening degree of the flow rate control valve 501 is adjusted so as to set at the air flow rate determined at step 6.

Figure 4:
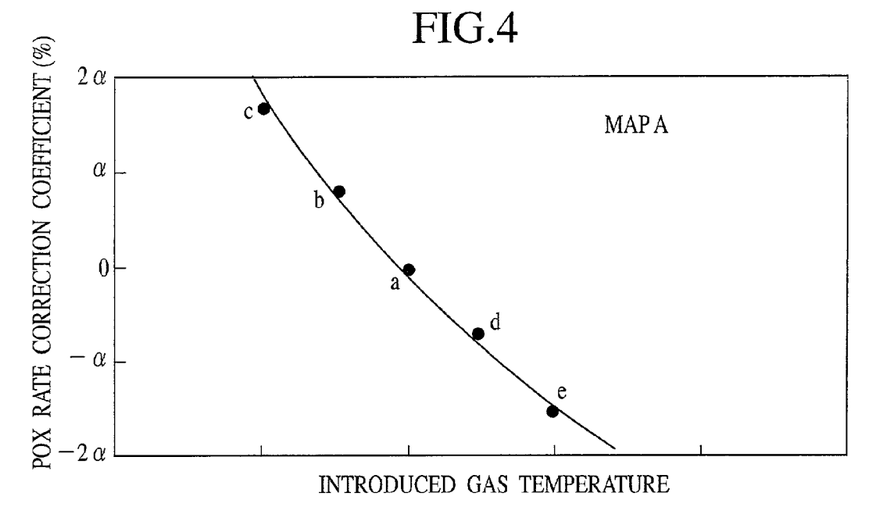
FIG. 4 is a graph of map A (POX rate correction coefficient in relation to vapor temperature) used in the first embodiment.

In this control sequence, depending on the vapor flow rate and vapor temperature supplied from the evaporator 102, the fuel is supplied into the ATR reactor 107 while the air flow rate is always controlled to be the POX rate corrected by map A.

Figure 6:
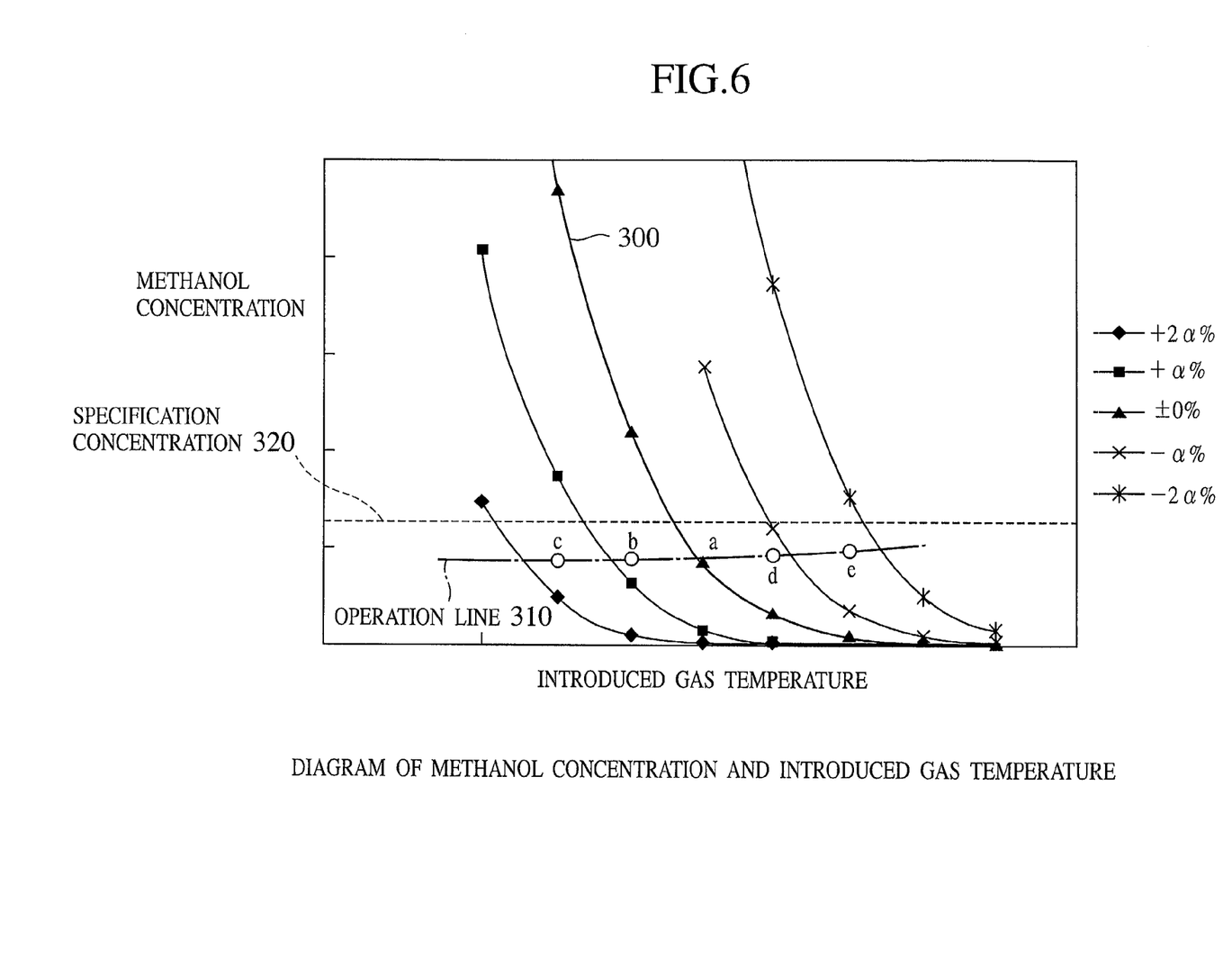
FIG. 6 is a graph showing the dependence of methanol concentration in the exhaust reformed gas of the ATR reactor on vapor temperature supplied into the ATR reactor in the first embodiment, in which points a to e correspond to the points in FIG. 4.
Figure 7:
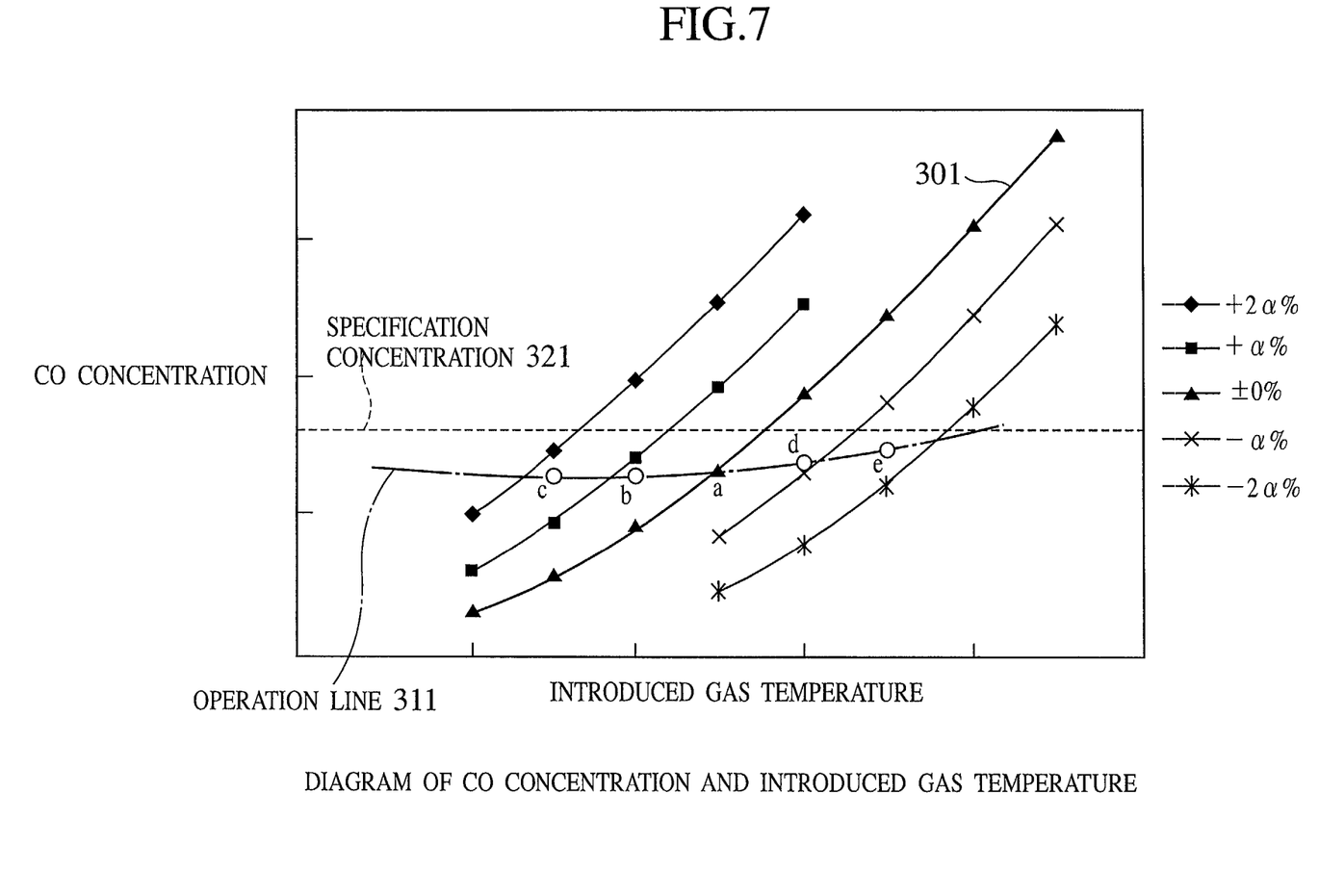
FIG. 7 is a graph showing the dependence of CO concentration in exhaust reformed gas of the ATR reactor on the vapor temperature supplied into the ATR reactor in the first embodiment, in which points a to e correspond to the points in FIG. 6.

In the fuel reforming system of the first embodiment, the operation is explained below. FIG. 6 shows a dependence of the methanol concentration in the reformed gas supplied from the ATR reactor 107 into the shift reactor 108, on vapor temperature supplied into the ATR reactor 107. Similarly, FIG. 7 shows a dependence of the CO concentration in the reformed gas supplied from the ATR reactor 107 into the shift reactor 108, on vapor temperature supplied into the ATR reactor 107. These are the results of simulation of the series of chemical reaction formulas mentioned in the explanation of the prior art, busing the chemical reaction rate in the catalyst used in the ATR reactor 107.

In FIG. 6 and FIG. 7, lines 320 and 321 indicate the specification concentrations specifying the upper limit of the methanol and CO concentration in the reformed gas to be supplied from the ATR reactor 107 to the shift reactor 108.

Curve line 300 in FIG. 6 shows temperature dependence in the autothermal condition, that is, when the POX rate is fixed, and point a is the design point. When vapor temperature hikes, the methanol concentration declines, and hence there is no problem, but when vapor temperature drops, the methanol concentration elevates, possibly failing to satisfy the specification of the methanol concentration of the reformed gas to be supplied into the shift reactor 108.

Curve line 301 in FIG. 7 shows temperature dependence in the autothermal condition, that is, when the POX rate is fixed, and point a is the design point. When vapor temperature is lowered, the CO concentration descends, and there is no problem, but when vapor temperature rises, the CO concentration climbs up, possibly failing to satisfy the specification of the CO concentration of the reformed gas to be supplied into the shift reactor 108.

The concentration of the methanol and CO discharged from the ATR reactor 107 is in a reverse relation to vapor temperature, that is, in trade-off relation.

Meanwhile, FIG. 6 and FIG. 7 also show results of simulation when the POX rate rpox (%) is corrected as shown in the following numerical formula 2 by using the correction coefficients of POX rate kpox=±2α, ±α(%).

$$r_{POX} = \left(1 + \frac{k_{POX}}{100}\right) \cdot r_{POX,0} \qquad (2)$$

It is known from here that the methanol concentration is lowered and the CO concentration rises up when corrected so as to increase the POX rate rpox (%), and, to the contrary, when corrected to decrease the POX rate rpox (%), the methanol concentration ascends and the CO concentration descends.

By drawing an operation line 310 in a region of concentration below the specification concentration specified by line 320 in FIG. 6, when the POX rate is determined at points c, b, d, e on the operation line 310 at each vapor temperature and the CO concentration at each point is plotted in FIG. 7, operation line 311 is obtained.

When points on the obtained operation lines 310, 311 are plotted in the relation between vapor temperature and correction coefficient kpox of POX rate, map A shown in FIG. 4 is obtained. Therefore, when the POX rate is corrected depending on vapor temperature by using map A, the concentration of methanol and CO of the reformed gas supplied from the ATR reactor 107 into the shift reactor 108 is the concentration determined by the vapor temperature and the operation lines 310, 311 in FIG. 6 and FIG. 7. As a result, if the vapor temperature fluctuates, it is below the concentration of the specification concentration 320, 321, and the ATR reactor 107 can supply the reformed gas capable of removing the CO in the shift reactor 108 if the vapor temperature varies, and therefore the PROX reactor 109 can supply the reformed gas reduced in the CO concentration so as to be usable in the fuel cell 200.

Figure 8:
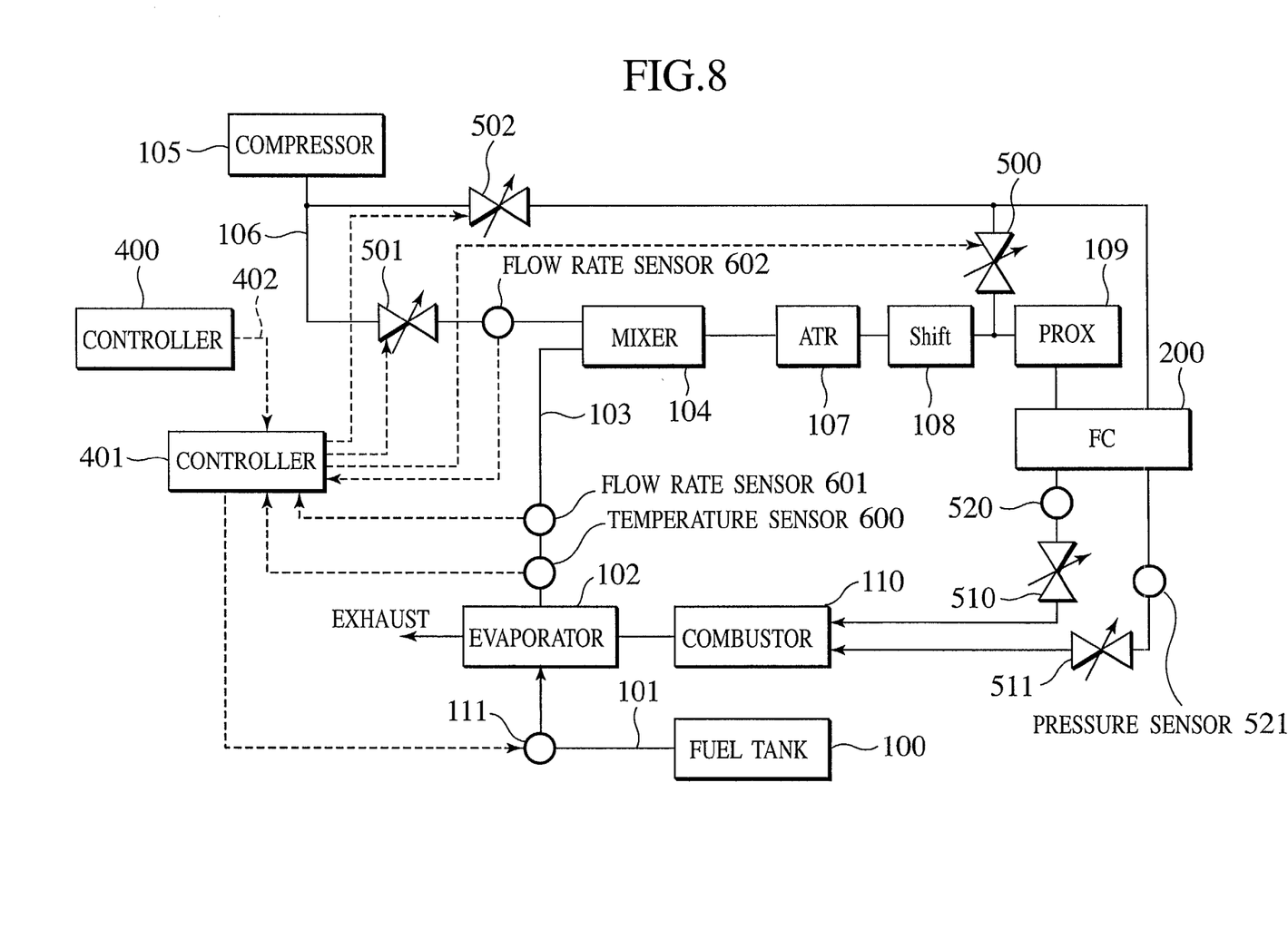
FIG. 8 is a block diagram of a second embodiment of the invention.

A second embodiment of the invention is explained by referring to FIG. 8. It is a feature of the second embodiment that the position of the temperature sensor 600 in the first embodiment shown in FIG. 2 is moved onto the piping linking the evaporator 102 and mixer 104. Other constituent elements are same as in the first embodiment. The control sequence and operation of the second embodiment are same as in the first embodiment.

This embodiment relates to a fuel reforming system in which the change of a gas temperature introduced into the ATR reactor 107 is mainly induced by the change of a vapor temperature supplied in the evaporator 102, and in this system, instead of temperature of the gas introduced into the ATR reactor 107, temperature of the vapor supplied from the evaporator 102 may be detected to control by using a similar map.

Figure 9:
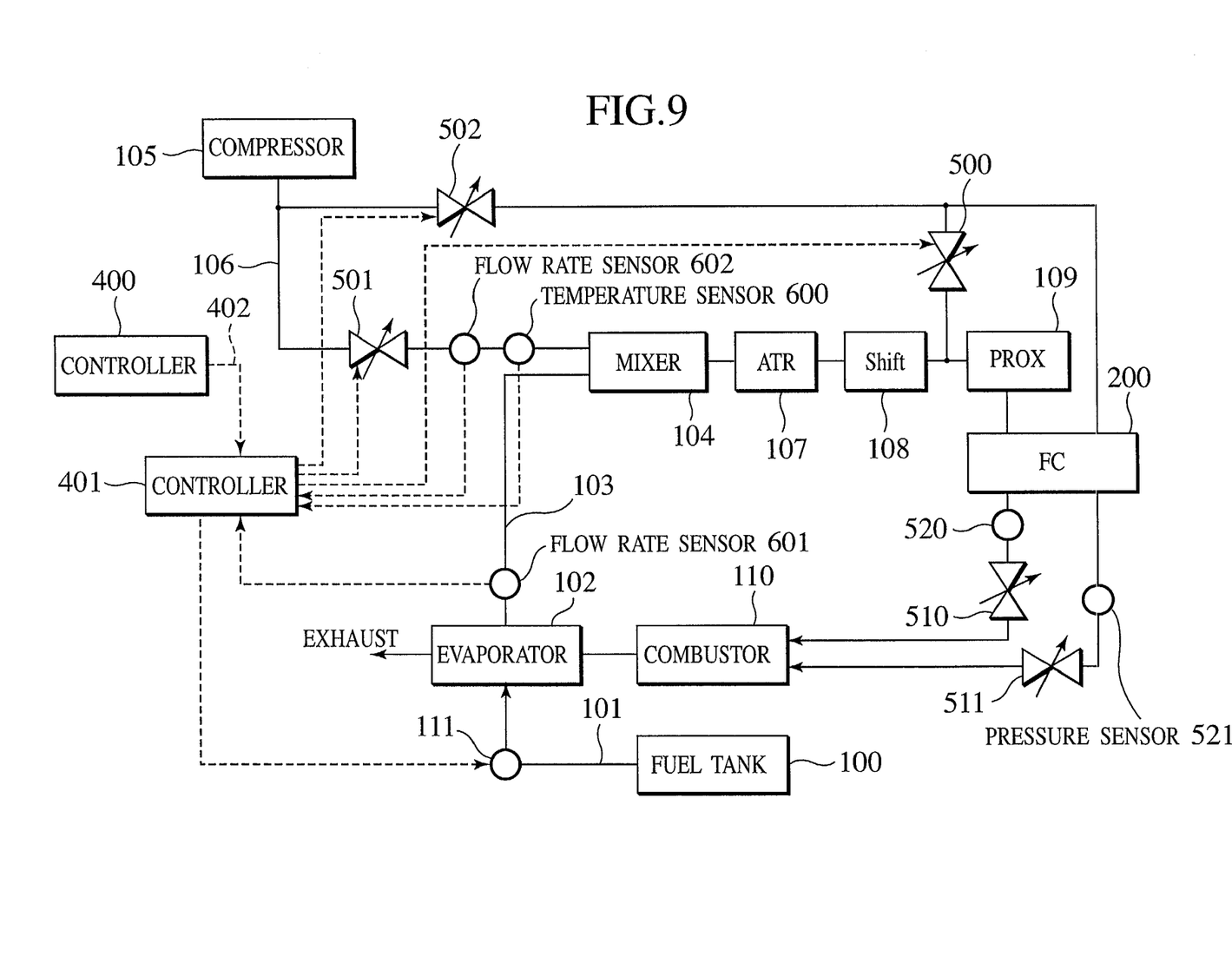
FIG. 9 is a block diagram of a third embodiment of the invention.

A fuel reforming system in a third embodiment of the invention is explained by referring to FIG. 9. It is a feature of the third embodiment that the temperature sensor 600 used in the first embodiment in FIG. 2 is moved onto the piping for supplying air into the mixer 104. Therefore, other constituent elements are common to those in the first embodiment. The control sequence and action are also same as in the first embodiment.

This embodiment relates to a fuel reforming system in which the change of gas temperature introduced into the ATR reactor 107 is mainly induced by the change of air temperature supplied in the ATR reactor 107, and in this system, instead of temperature of the gas introduced into the ATR reactor 107, temperature of the supply air may be detected to control by using a similar map.

A fuel reforming system in a fourth embodiment of the invention is explained. The configuration of the fourth embodiment is same as in the first embodiment shown in FIG. 2, but the control sequence of the fuel reforming controller 401 is different from that of the first embodiment shown in FIG. 3, which is as shown in FIG. 10.

Figure 10:
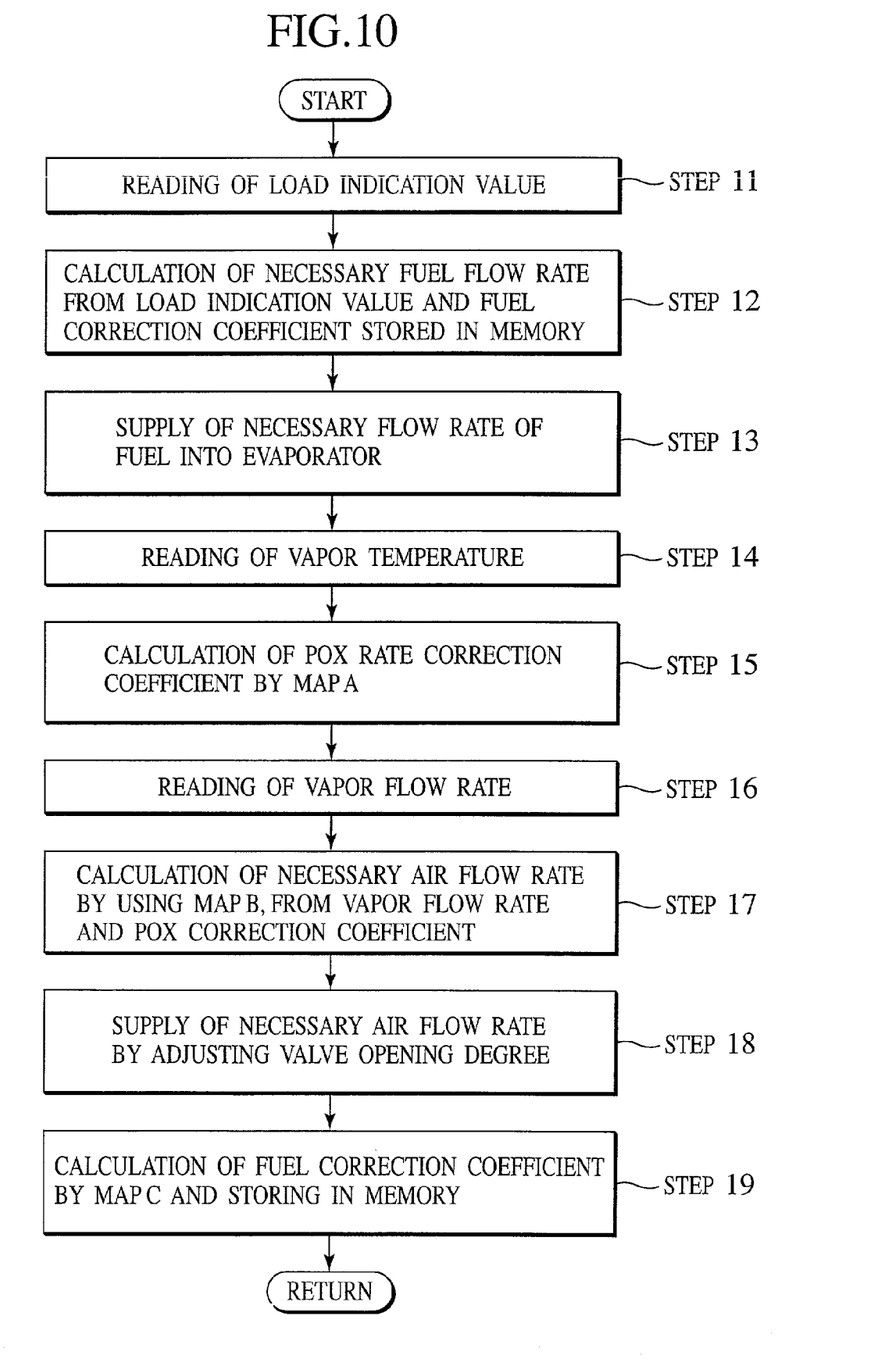
FIG. 10 is a control sequence diagram in a fourth embodiment of the invention.

The control sequence of the fuel reforming controller 401 in the fuel reforming system of the fourth embodiment is explained by referring to FIG. 10.

Step 11: The fuel reforming controller 401 reads in an operation load signal 402 of the fuel reforming system sent from the controller 400.

Step 12: From the operation load signal 402 and the fuel flow rate correction coefficient $k_{Fuel}$ (%) of the fuel supplied into the evaporator 102 stored in the memory, the required fuel flow rate $F_{fuel,liq}$ determined in the following numerical formula 3.

$$F_{fuel,liq} = \left(1 + \frac{k_{Fuel}}{100}\right) \cdot k_2 \cdot r_{con} \quad (3)$$

where $F_{fuel,liq}$: required flow rate of liquid fuel (3)

$r_{con}(kW)$: load signal $k_2$: conversion coefficient.

Step 13: A required flow rate of liquid fuel $F_{fuel,liq}$ is supplied into the evaporator 102.

Step 14: The signal value of vapor temperature of the temperature sensor 600 is read in.

Step 15: From the signal value of vapor temperature of the temperature sensor 600, the correction coefficient kpox (%) of POX rate is determined by using map A in FIG. 4.

Step 16: The signal value of the vapor flow rate of the fuel of the flow rate sensor 601 is read in.

Step 17: From the signal value of the vapor flow rate of the fuel and the correction coefficient kpox (%) of the POX rate determined at step 15, the air flow rate to be supplied is determined by using map B in FIG. 5.

Step 18: The opening degree of the flow rate control valve 501 is adjusted so as to conform to the air flow rate determined at step 16.

Step 19: Using map C shown in FIG. 11, from the correction coefficient kpox (%) of the POX rate determined at step 15, the fuel flow rate correction coefficient $k_{Fuel}$ (%) of the fuel supplied into the evaporator 102 is determined and set in the memory. Herein, if the correction coefficient kpox (%) of the POX rate is 3%, the value of the fuel flow rate correction coefficient $k_{Fuel}$ (%) is about 1%. The initial value of the memory is 0.

In the fuel reforming system of the fourth embodiment, the operation is explained below. In the foregoing first embodiment, if the POX rate of the design specification (autothermal condition) is, for example, 30%, and its correction rate is in a range of ±10%, the POX rate after correction is 27 to 33%. If the change is by such extent, the flow rate of hydrogen in reformed gas is changed only about ±1%, and the fuel cell 200 discharges about 20% of hydrogen without use to allow to burn in the combustor 110, and therefore the change of the hydrogen flow rate in the obtained reformed gas is within an error range, and no particular measure is needed. However, when the first embodiment is applied in a system in which the POX rate changes significantly, if temperature of the gas introduced into the ATR reactor 107 changes, the methanol concentration and CO concentration in the reformed gas obtained from the ATR reactor 107 can satisfy the specification, but if the correction coefficient of the POX rate is a large positive value, the obtained hydrogen amount decreases, and the power generation required in the fuel cell 200 cannot be produced. To the contrary, in the case of a system with a large negative value of correction coefficient of the POX rate, the hydrogen amount discharged from the fuel cell 200 without being consumed increases, which may lead to drop of system efficiency or overheating of the combustor 110 or evaporator 102.

By contrast, in the fourth embodiment, when the correction coefficient of the POX rate is positive, the fuel flow rate is increased to control so as not to decrease the obtained hydrogen amount, or when the correction coefficient of the POX rate is a large negative value, the fuel flow rate is reduced to control so as not to increase the hydrogen amount, and therefore the hydrogen amount is invariable if the POX rate is changed.

The embodiments are explained by referring to specific drawings, but the invention is not limited to such description and illustration alone. Other examples are presented below.

In the foregoing embodiments, the POX rate is used as the parameter value for control, the air flow rate necessary for fuel flow rate is determined from the POX rate, and the POX rate is corrected according to gas temperature introduced into the reformer, but not limited to this mechanism, without using the parameter of POX rate, a map or function of air flow rate necessary for fuel flow rate may be used, and the POX rate may be corrected by gas temperature introduced into the reformer.

Instead of measuring temperature of the gas introduced into the fuel reformer, any other value may be used as far as the change of temperature of the gas introduced into the fuel reformer can be estimated, and the value may estimate temperature of the vapor and air introduced into the mixer and temperature of the gas introduced into the fuel reformer from their flow rates.

As the flow rate of the vapor, the signal of the flowmeter for measuring the flow rate of the vapor is used, but the vapor flow rate may be replaced by other proper value, for example, the vapor flow rate converted from the flow rate of the raw liquid fuel of the vapor generated in the evaporator to be supplied into the evaporator or from the rotating speed of the pump, or the vapor flow rate estimated from the characteristic map of the evaporator, loss time or time constant. As for the air flow rate, similarly, instead of using the signal from the flowmeter, other proper value representing the air flow rate may be used, for example, a value estimated from the valve opening degree and back pressure of air.

Herein, methanol is used as the liquid fuel, but gasoline or other liquid fuel may be used, or gas fuel such as methane may be also applicable depending on the cases.

The liquid fuel methanol and water are stored in a tank, and used as a mixed solution, but they may be stored in different tanks, or instead of one evaporator, two evaporators may be used for evaporating methanol and water independently.

Figure 11:
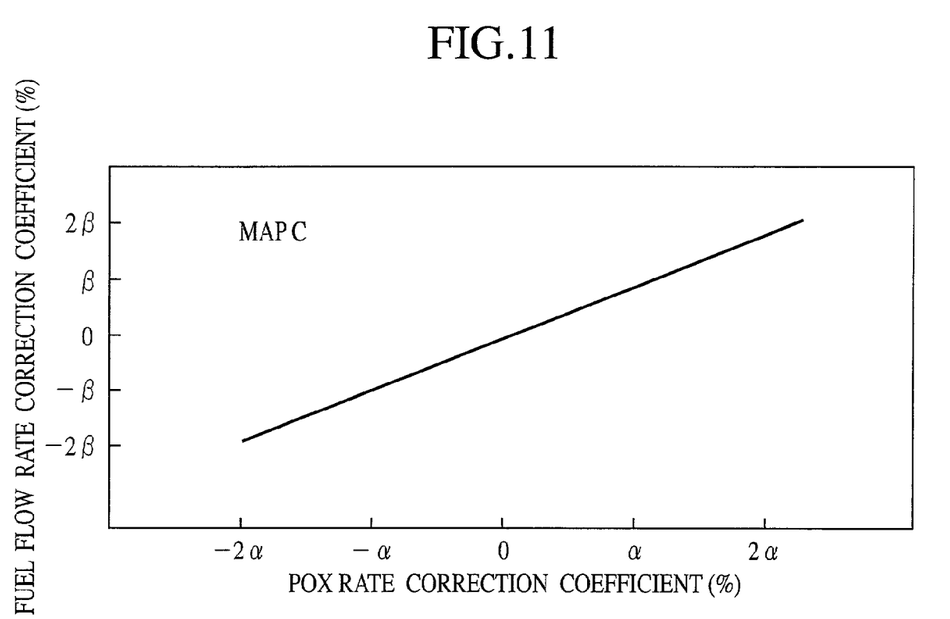
FIG. 11 is a graph of map C (fuel flow rate correction coefficient in relation to POX rate correction coefficient) used in the fourth embodiment.

As map C in FIG. 11, a map of linear function of POX rate correction coefficient and fuel flow rate correction coefficient is used, but a map for correcting the fuel flow rate only when exceeding a certain range, without correcting the fuel flow rate as far as the POX rate correction coefficient is within the range, may be used.

As the fuel reformer, an example of autothermal reactor is used, but the invention may be similarly applied in fuel reforming reaction using gas containing the oxygen as in the partial oxidation reactor based on partial oxidation reaction.

What is claimed is:

1. A fuel reforming system comprising a fuel reformer for generating a reformed gas containing hydrogen by using a gas containing vapors of a gas fuel or a liquid fuel and a gas containing oxygen, a mixer of vapors of the gas fuel or the liquid fuel and the gas containing the oxygen, a supplier of vapors of the gas fuel or the liquid fuel into said fuel reformer through the mixer, a supplier of the gas containing the oxygen into said fuel reformer through the mixer, and a controller of a first flow rate of the vapors of the gas fuel or the liquid fuel supplied into said fuel reformer and of a second flow rate of the gas containing the oxygen supplied into said fuel reformer, further comprising:

a detector of the first flow rate of the vapors adapted to obtain a detected first flow rate;

a detector of the second flow rate of the gas adapted to obtain a detected second flow rate; and a temperature detector of at least one of the vapors of the gas fuel or the liquid fuel supplied into said fuel reformer, the gas containing the oxygen supplied into said fuel reformer, and a mixture of vapors of the gas fuel or the liquid fuel and the gas containing the oxygen, and a controller configured to correct a ratio of the first flow rate of the vapors to the second flow rate of the gas depending on the output of said temperature detector, thereby obtaining a corrected ratio, determine the second flow rate to be supplied to the supplier of the gas containing the oxygen according to the detected first flow rate and the corrected ratio, and adjust a flow rate of the gas containing the oxygen into said fuel reformer by controlling the supplier of the gas containing the oxygen according to the determined second flow rate.

2. The fuel reforming system of claim 1, wherein the flow rate of the gas fuel, the flow rate of the vapor of the liquid fuel, or the flow rate of the liquid fuel is corrected and supplied depending on the corrected ratio of the flow rate of the vapor of the gas fuel or the liquid fuel to the flow rate of the gas containing the oxygen.

3. The system of claim 1, wherein the supplier of gas containing oxygen includes a device adapted to obtain atmospheric air, the gas containing oxygen being at least in part obtained from the atmospheric air.

4. The system of claim 1, wherein the supplier of gas containing oxygen includes a compressor adapted to obtain atmospheric air, the gas containing oxygen being at least in part obtained from compressed atmospheric air obtained by the compressor.

5. The system of claim 1, wherein the temperature detector detects the temperature of the vapors of the gas fuel or the liquid fuel, and wherein the output of the temperature detector is indicative of the temperature of the vapors of the gas fuel or the liquid fuel.

6. The system of claim 1, wherein the temperature detector detects the temperature of the gas containing the oxygen, and wherein the output of the temperature detector is indicative of the temperature of the gas containing oxygen.

7. The system of claim 1, further comprising a reforming reactor, wherein the mixer supplies the mixture of vapors of the gas fuel or the liquid fuel and the gas containing the oxygen to the reforming reactor.

8. The system of claim 1, further comprising a reforming reactor, wherein the mixer supplies the mixture of vapors of the gas fuel or the liquid fuel and the gas containing the oxygen to the reforming reactor, the mixture of gas and vapor supplied to the reforming reactor being non-combusted and non-converted.

9. A fuel reforming method of a fuel reforming system, said fuel reforming system having a fuel reformer for generating a reformed gas containing hydrogen by using a gas containing vapors of a gas fuel or a liquid fuel and a gas containing oxygen, a mixer of vapors of the gas fuel or the liquid fuel and the gas containing the oxygen, a first supplier of the vapors of the gas fuel or the liquid fuel into said fuel reformer through the mixer, and a second supplier of the gas containing the oxygen into said fuel reformer through the mixer, comprising:

supplying the liquid fuel into the first supplier;

detecting a temperature of the vapor of the gas fuel or the liquid fuel supplied into said fuel reformer;

determining a first correction coefficient of a ratio of a first flow rate of the vapors of the gas fuel to a second flow rate of the gas containing the oxygen according to the detected temperature;

detecting the first flow rate of the vapors;

determining the second flow rate to be supplied to the second supplier according to the detected first flow rate and the determined first correction coefficient; and adjusting a flow rate of the gas containing the oxygen into said fuel reformer by controlling the second supplier according to the determined second flow rate.

10. A fuel reforming method of a fuel reforming system of claim 9, further comprising:

prior to supplying the liquid fuel, determining a required flow rate of the liquid fuel to be supplied to the first supplier of vapors according to a memorized fuel flow rate correction coefficient; and after adjusting the flow rate of the gas, determining the fuel flow rate correction coefficient according to the determined first correction coefficient.

11. The method of claim 9, further comprising the action of obtaining atmospheric air and utilizing the atmospheric air for at least part of the gas containing oxygen.

12. The method of claim 9, further comprising supplying the mixture of vapors of the gas fuel or the liquid fuel and the gas containing the oxygen to a reforming reactor.

13. The method of claim 9, further comprising supplying the mixture of vapors of the gas fuel or the liquid fuel and the gas containing the oxygen, the mixture of gas and vapor supplied to a reforming reactor, the mixture being supplied in an non-combusted and non-converted state.

* * * * *